H. N. MOTSINGER.
CARBURETER.
APPLICATION FILED JUNE 19, 1914.
1,165,359.
Patented Dec. 21, 1915.
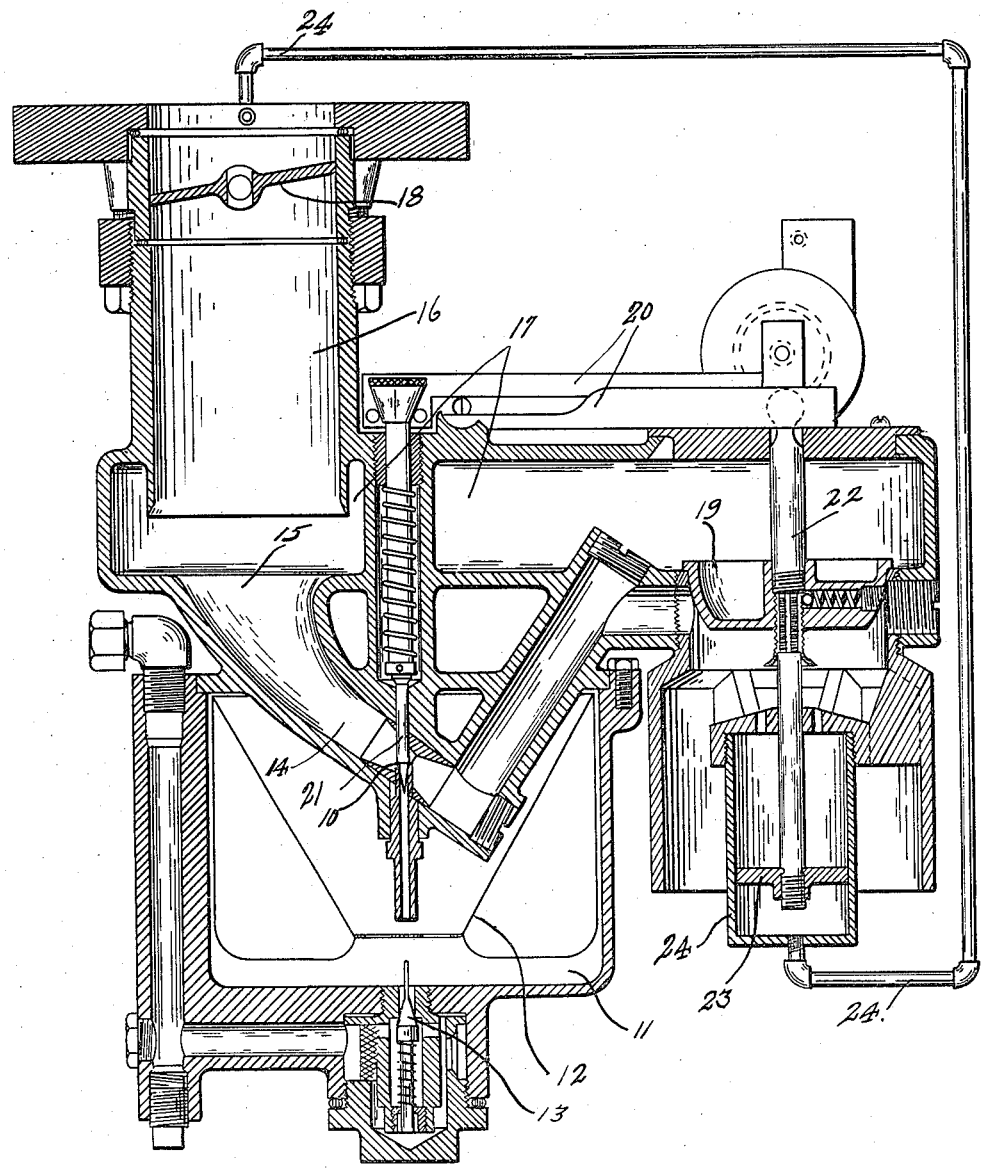
WITNESSES:
INVENTOR
HOMER N. MOTSINGER
BY
ATTORNEYS

UNITED STATES PATENT OFFICE.

HOMER N. MOTSINGER, OF LA FAYETTE, INDIANA.

CARBURETER.

1,165,359. Specification of Letters Patent. Patented Dec. 21, 1915.

Application filed June 19, 1914. Serial No. 846,019.

*To all whom it may concern:*

Be it known that I, HOMER N. MOTSINGER, a citizen of the United States, residing at La Fayette, in the county of Tippecanoe and State of Indiana, have invented a new and useful Carbureter, of which the following is a specification.

In many modern carbureters there is a primary air inlet and a secondary air inlet, and the fuel nozzle is located in the path of the primary air so that the fuel is picked up by such primary air to produce the initial mixture, this initial mixture then being mixed with the secondary air to produce the final mixture, and the supply of this final mixture to the engine being controlled by a throttle valve. With this type of carbureter, or, in fact, in any type, it is highly desirable to finely subdivide, or nebulize, the fuel and in order to do this, some form of nebulizing nozzle has been found to be satisfactory if a sufficiently high velocity of air is maintained across such nozzle, but difficulty has heretofore been found in producing the desired air velocity at low speeds of the engine without producing an excessive throttling at high speeds of the engine under light loads.

The object of my present invention is, therefore, to provide a construction in which desired air velocities at low engine speeds can be produced without limiting the maximum capacity of the carbureter. I accomplish this by reducing the proportion of secondary air to primary air as the throttle valve is moved toward closed position, and making this reduction dependent on the increased vacuum produced beyond the throttle valve as it is so moved. In other words, increase of vacuum above the throttle automatically increases the vacuum below the throttle but without a corresponding opening of the air valve. In the preferred form of my invention, I provide an automatic valve controlling the secondary air inlet and connect this valve to controlling means, such as a cylinder and piston, responsive to the pressure, or vacuum, beyond the throttle valve.

The accompanying drawing illustrates my invention, the single figure being a vertical section through a carbureter embodying my invention.

The fuel nozzle 10, shown as supplied with fuel from a fuel bowl 11 in which a constant level of the liquid fuel is maintained by the float 12 and the valve 13 operated thereby, is located in the primary air passage 14, the other end 15 of which discharges to a vertical tube or passage 16, the lower end of which is also connected to the secondary air passage 17. The throttle valve 18 is located in the tube 16. The inlet to the secondary air passage 17 is controlled by a valve 19, which is shown as connected, by mechanism 20 the details of which are not essential to this present application, to the valve 21 of the fuel nozzle, so that the two valves 19 and 21 open and close together. The valve stem 22 of the valve 19 is connected to a piston 23 slidable in a cylinder 24, the upper end of said cylinder being open to the atmosphere and the lower end being connected by a pipe 24 to the explosive-mixture passage.

In operation, the engine will produce a vacuum in the passage 16 which will be practically equal on both sides of valve 18, and there will be some small suction effect tending to draw piston 23 downwardly, which, acting upon the air valve 19, will tend to hold that valve toward its closed position but, as the area of piston 23 is less than that of valve 19, and as pipe 24 is comparatively small, this effect is neither especially noticeable or objectionable. In this condition of the parts, such a proportion of air will be drawn through the primary air passage 14 as to give that air a satisfactory velocity as it passes the fuel nozzle. Where valve 18 is swung toward its closed position, the vacuum on the engine-side of the valve is, of course, greater than that on the carbureter side and this condition, in the common forms of carbureters of this type, results in a decrease in velocity of the air passing through the primary air passage 14 and a consequent decrease in the nebulizing effect of that air on the fuel. In my present construction, however, the relative increase of vacuum on the engine side of the valve 18 results in a relatively greater downward pull on valve 19, through piston 23, and the valve 19 is thus caused to occupy a position closer to its closed position than it otherwise would. This automatic holding of the air valve 19 causes a greater proportion of air to pass through the primary air passage 14 and thus increases the velocity of that air past the fuel nozzle, with a corresponding increase in the nebulizing effect on the fuel.

I claim as my invention:

1. In a carbureter, the combination of a primary air passage, a fuel nozzle therein, a secondary air passage, an air valve controlling the flow of air through said secondary air passage, a fuel valve controlling the supply of fuel to the fuel nozzle and connected to said air valve to be operated therewith, a mixture passage to which both said primary air passage and said secondary air passage discharge, a throttle in said mixture passage on the discharge side of the point where the secondary air passage discharges thereinto, and means responsive to the pressure in said mixture passage on the discharge side of said throttle for controlling said air valve.

2. In a carbureter, the combination of a primary air passage, a fuel nozzle therein, a secondary air passage, a valve controlling the flow of air through said secondary air passage, a mixture passage to which both said primary air passage and said secondary air passage discharge, a throttle in said mixture passage on the discharge side of the point where the secondary air passage discharges thereinto, and means responsive to the pressure in said mixture passage on the discharge side of said throttle for controlling said valve.

3. In a carbureter, the combination of a primary air passage, a fuel nozzle therein, a secondary air passage, an air valve controlling the flow of air through said secondary air passage, a fuel valve controlling the supply of fuel to the fuel nozzle and connected to said air valve to be operated therewith, a mixture passage to which both said primary air passage and said secondary air passage discharge, a throttle in said mixture passage on the discharge side of the point where the secondary air passage discharges thereinto, a cylinder and piston one of which is mechanically connected to said air valve, and a pneumatic connection between said cylinder and said mixture passage on the discharge side of said throttle.

4. In a carbureter, the combination of a primary air passage, a fuel nozzle therein, a secondary air passage, a valve controlling the flow of air through said secondary air passage, a mixture passage to which both said primary air passage and said secondary air passage discharge, a throttle in said mixture passage on the discharge side of the point where the secondary air passage discharges thereinto, a cylinder and piston one of which is mechanically connected to said valve, and a pneumatic connection between said cylinder and said mixture passage on the discharge side of said throttle.

5. In a carbureter, the combination of a primary air passage, a fuel nozzle therein, a secondary air passage, an air valve controlling the flow of air through said secondary air passage, a fuel valve controlling the supply of fuel to the fuel nozzle and connected to said air valve to be operated therewith, a mixture passage to which both said primary air passage and said secondary air passage discharge, a throttle in said mixture passage on the discharge side of the point where the secondary air passage discharges thereinto, a chamber having a movable wall connected to said air valve, and a pneumatic connection between said chamber and said mixture passage on the discharge side of said throttle.

6. In a carbureter, the combination of a primary air passage, a fuel nozzle therein, a secondary air passage, a valve controlling the flow of air through said secondary air passage, a mixture passage to which both said primary air passage and said secondary air passage discharge, a throttle in said mixture passage on the discharge side of the point where the secondary air passage discharges thereinto, a chamber having a movable wall connected to said valve, and a pneumatic connection between said chamber and said mixture passage on the discharge side of said throttle.

7. In a carbureter, the combination of a primary air passage, a fuel nozzle therein, a secondary air passage, a valve controlling the flow of air through said secondary air passage, a fuel valve controlling the supply of fuel to the fuel nozzle and connected to said air valve to be operated therewith, a mixture passage to which both said primary air passage and said secondary air passage discharge, a throttle in said mixture passage on the discharge side of the point where the secondary air passage discharges thereinto, a chamber having a movable wall connected to said air valve, and a pneumatic connection other than the aforesaid passages between said chamber and said mixture passage, said chamber being closed save for such connection.

8. In a carbureter, the combination of a primary air passage, a fuel nozzle therein, a secondary air passage, a valve controlling the flow of air through said secondary air passage, a mixture passage to which both said primary air passage and said secondary air passage discharge, a throttle in said mixture passage on the discharge side of the point where the secondary air passage discharges thereinto, a cylinder and piston one of which is mechanically connected to said valve, and pneumatic connections between said cylinder on opposite sides of said piston to the atmosphere and to the mixture passage on the discharge side of the throttle respectively.

9. In a carbureter, the combination of a primary air passage, a fuel nozzle therein, a secondary air passage, an air valve controlling the flow of air through said secondary air passage, a fuel valve controlling the supply of fuel to the fuel nozzle and connected to said air valve to be operated therewith, a mixture passage to which both said primary air passage and said secondary air passage discharge, a throttle in said mixture passage on the discharge side of the point where the secondary air passage discharges thereinto, and means connected to said air valve and tending to close it in proportion to the vacuum in said mixture passage on the discharge side of the throttle.

10. In a carbureter, the combination of a primary air passage, a fuel nozzle therein, a secondary air passage, a valve controlling the flow of air through said secondary air passage, a mixture passage to which both said primary air passage and said secondary air passage discharge, a throttle in said mixture passage on the discharge side of the point where the secondary air passage discharges thereinto, and means connected to said valve and tending to close it in proportion to the vacuum in said mixture passage on the discharge side of the throttle.

11. In a carbureter, the combination of a primary air passage, a fuel nozzle therein, a secondary air passage, a suction-controlled valve controlling the flow of air through said secondary air passage and tending to open as the suction increases in said secondary air passage, a mixture passage to which both said primary air passage and said secondary air passage discharge, a throttle in said mixture passage on the discharge side of the point where said secondary air passage discharges thereinto, means responsive to the vacuum in said mixture passage on the discharge side of said throttle and tending to close said suction-controlled valve with a force which varies as such vacuum on the discharge side of said throttle, and a fuel valve controlling the supply of fuel to the fuel nozzle, said fuel valve and said suction-controlled valve being interconnected so as to operate together.

12. In a carbureter, the combination of a primary air passage, a fuel nozzle therein, a secondary air passage, a suction-controlled valve controlling the flow of air through said secondary air passage and tending to open as the suction increases in said secondary air passage, a mixture passage to which both said primary air passage and said secondary air passage discharge, a throttle in said mixture passage on the discharge side of the point where said secondary air passage discharges thereinto, and means responsive to the vacuum in said mixture passage on the discharge side of said throttle and tending to close said suction-controlled valve with a force which varies as such vacuum on the discharge side of said throttle.

13. In a carbureter, the combination of a primary air passage, a fuel nozzle therein, a secondary air passage, a valve controlling the flow of air through said secondary air passage, a mixture passage to which both said primary air passage and said secondary air passage discharge, a throttle in said mixture passage on the discharge side of the point where said secondary air passage discharges thereinto, a chamber having a movable wall, a pneumatic connection between said chamber and said mixture passage on the discharge side of said throttle, and a connection between said movable wall and said valve so that the movement of the wall as the pressure in such chamber decreases tends to close such valve.

14. In a carbureter, the combination of a primary air passage, a fuel nozzle therein, a secondary air passage, a valve controlling the flow of air through said secondary air passage, a mixture passage to which both said primary air passage and said secondary air passage discharge, a throttle in said mixture passage on the discharge side of the point where said secondary air passage discharges thereinto, a chamber having a movable wall, a pneumatic connection between said chamber and said mixture passage on the discharge side of said throttle, and a connection between said movable wall and said valve so that the movement of the wall as the pressure in such chamber decreases tends to close such valve, said valve being mounted in said secondary air passage so that it tends to open as the suction in said secondary air passage increases.

15. In a carbureter, the combination of a primary air passage, a fuel nozzle therein, a secondary air passage, a mixture passage to which both said primary air passage and said secondary air passage discharge, a manually operated throttle and an automatic valve both controlling the passage of air through said secondary air passage, said throttle being located on the discharge side of said automatic valve, and means responsive to the vacuum on the discharge side of said throttle and tending to close said automatic valve with a force which varies as such vacuum on such discharge side of the throttle, said automatic valve tending to open as the vacuum increases on the intake side of said throttle.

16. In a carbureter, the combination of a primary air passage, a fuel nozzle therein, a secondary air passage, a mixture passage to which both said primary air passage and said secondary air passage discharge, a manually operated throttle and an automatic valve both controlling the passage of air through said secondary air passage, said throttle being located on the discharge side of said automatic valve, and means responsive to the vacuum on the discharge side of said throttle and tending to close said automatic valve with a force which varies as such vacuum on such discharge side of the throttle.

17. In a carbureter, the combination of a fuel nozzle, a throttle valve, an air inlet valve on the inlet side of said throttle valve and controlling a supply of air thereto, said air inlet valve tending to open as the suction on the inlet side of the throttle valve increases, and means responsive to the vacuum on the discharge side of said throttle valve and tending to close said inlet valve with a force which varies in the same sense as the vacuum on the discharge side of said throttle valve.

18. In a carbureter, the combination of a fuel nozzle, a throttle valve, an air inlet valve on the inlet side of said throttle valve and controlling a supply of air thereto, and means responsive to the vacuum on the discharge side of said throttle valve and tending to close said inlet valve with a force which varies in the same sense as the vacuum on the discharge side of said throttle valve.

19. In a carbureter, the combination of a fuel nozzle, a throttle valve, an air inlet valve on the inlet side of said throttle valve and controlling a supply of air thereto, said air inlet valve tending to open as the suction on the inlet side of the throttle valve increases, means responsive to the vacuum on the discharge side of said throttle valve and tending to close said inlet valve with a force which varies in the same sense as the vacuum on the discharge side of said throttle valve, and a fuel valve controlling the supply of fuel to said fuel nozzle and connected to said air inlet valve so as to be operated therewith.

20. In a carbureter, the combination of a fuel nozzle, a throttle valve, an air inlet valve on the inlet side of said throttle valve and controlling a supply of air thereto, and means responsive to the vacuum on the discharge side of said throttle valve and tending to close said inlet valve with a force which varies in the same sense as the vacuum on the discharge side of said throttle valve, and a fuel valve controlling the supply of fuel to said fuel nozzle and connected to said air inlet valve so as to be operated therewith.

In witness whereof, I have hereunto set my hand at Indianapolis, Indiana, this 16th day of June, A. D. one thousand nine hundred and fourteen.

HOMER N. MOTSINGER.

Witnesses:
ARTHUR M. HOOD,
FRANK A. FAHLE.